UNITED STATES PATENT OFFICE.

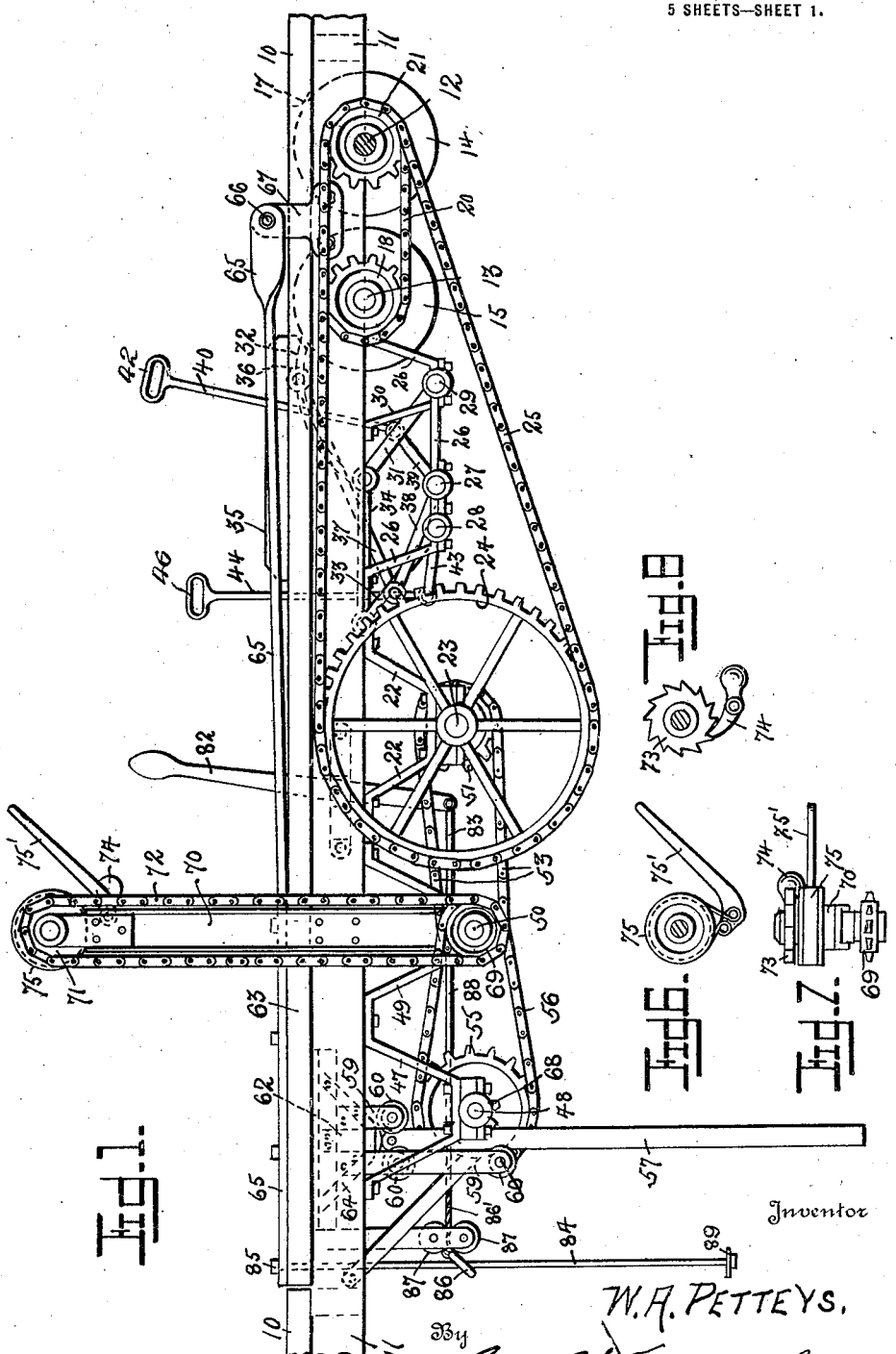

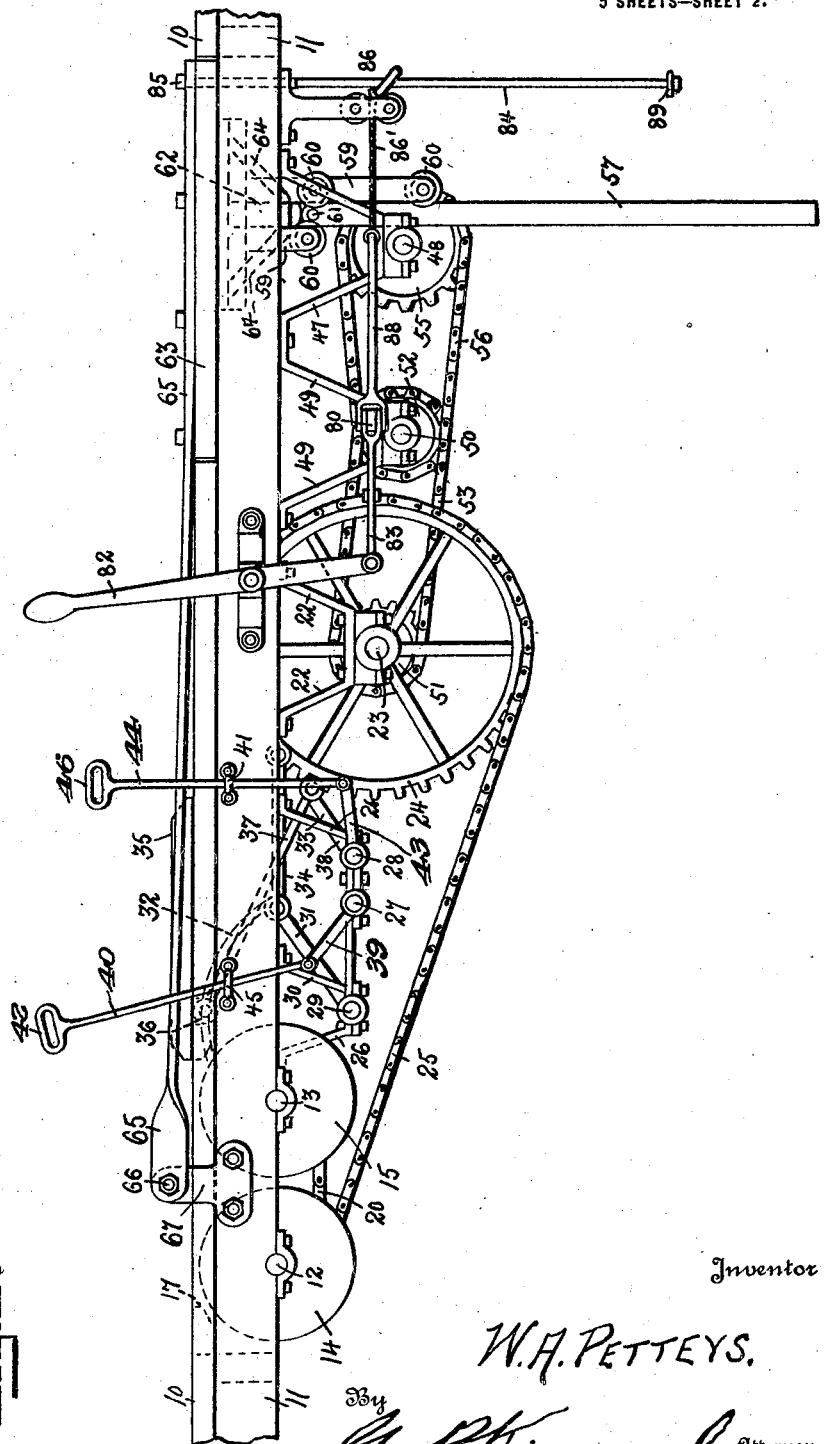

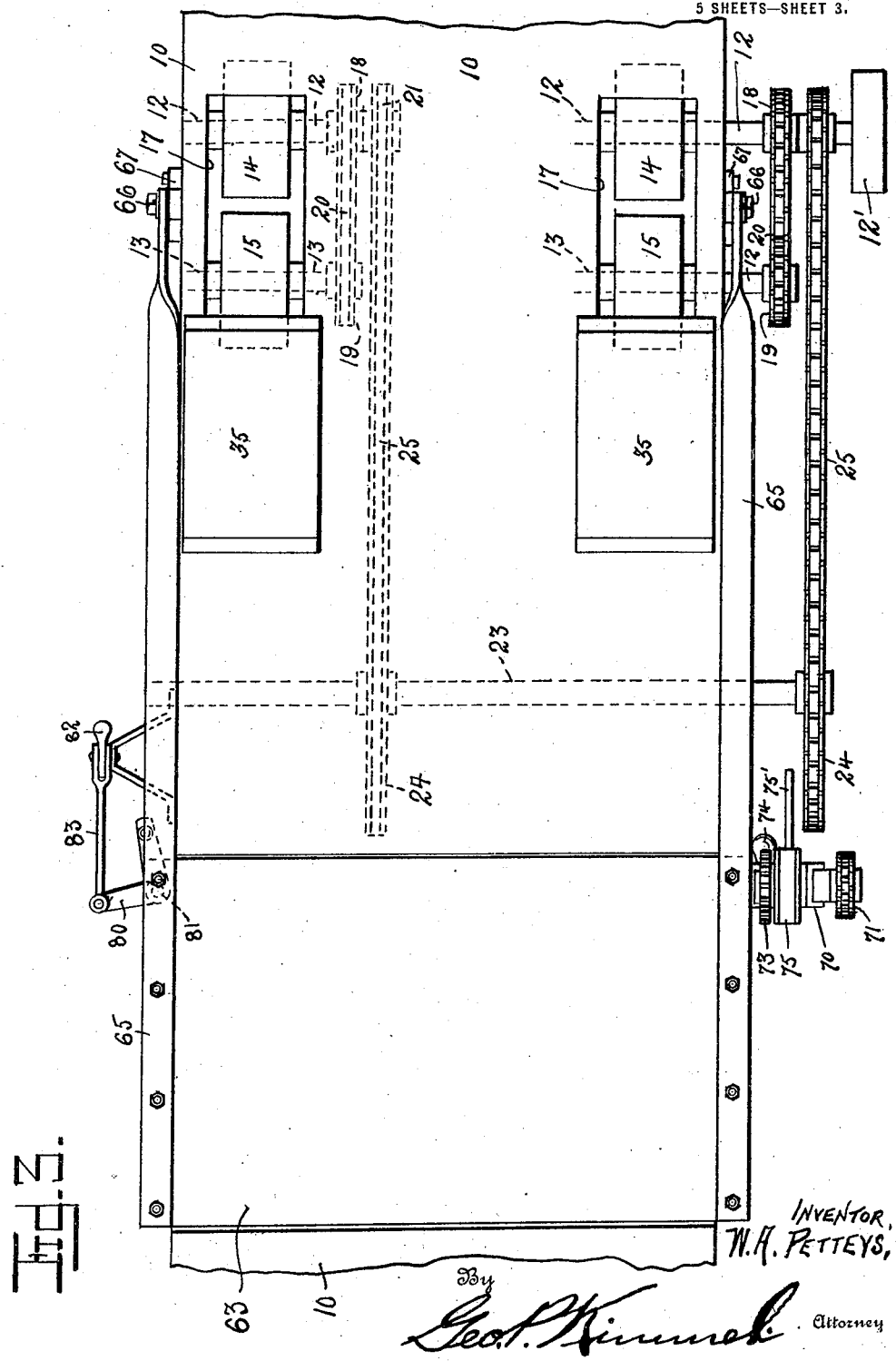

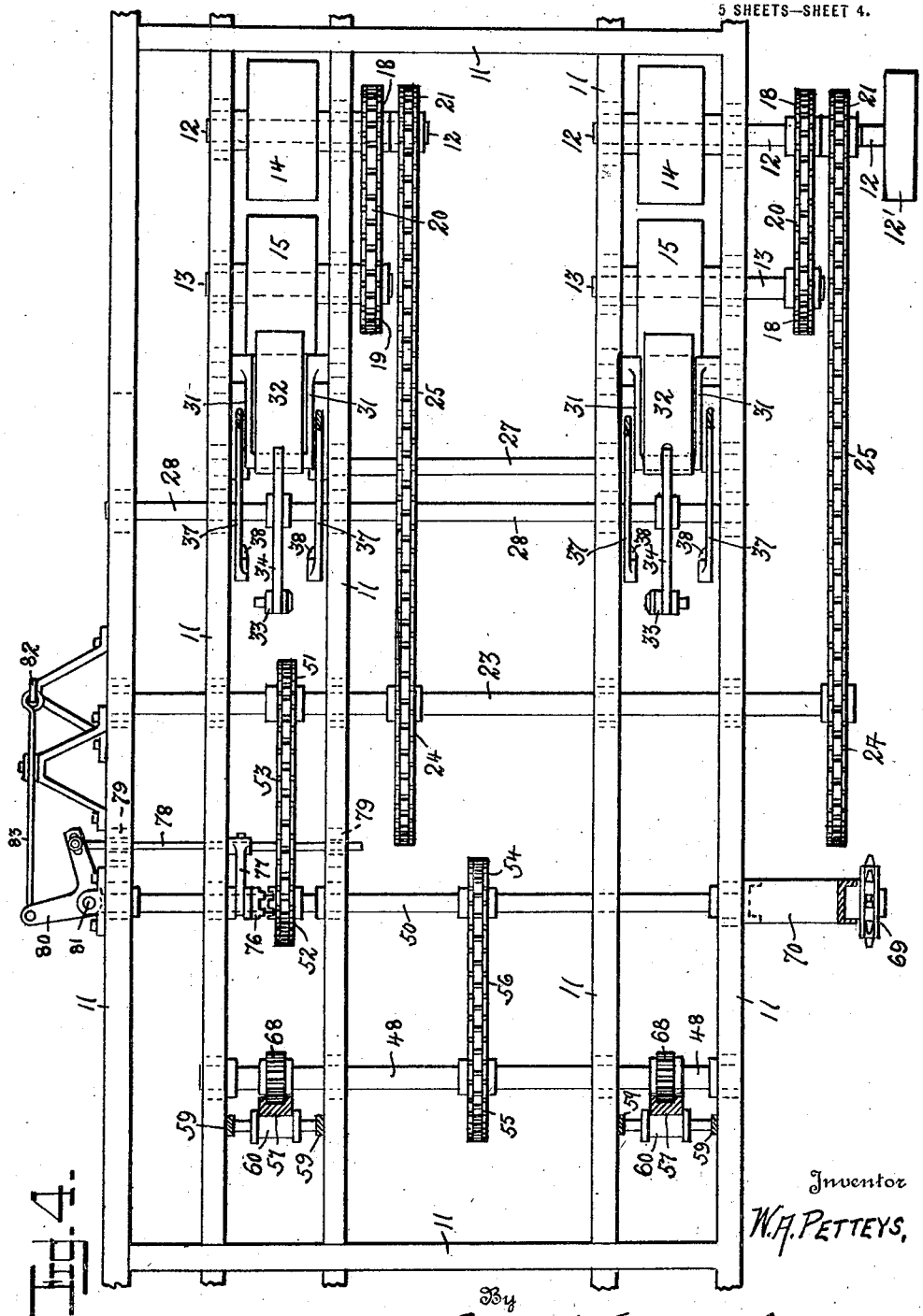

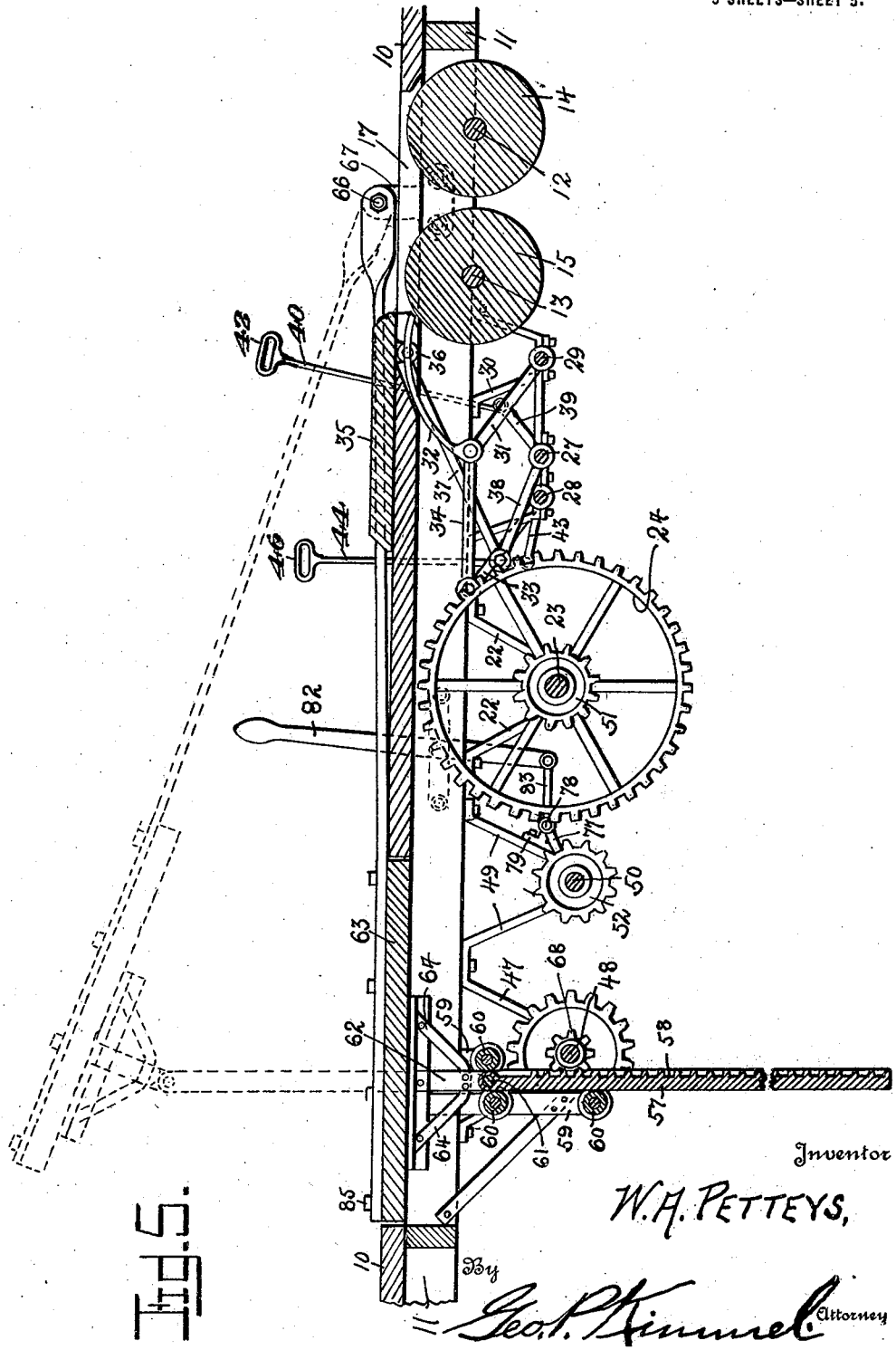

WILLARD A. PETTEYS, OF WILCOX, NEBRASKA.

TRUCK AND DUMP WAGON.

1,418,163.  Specification of Letters Patent.  Patented May 30, 1922.

Application filed October 12, 1920. Serial No. 416,338.

*To all whom it may concern:*

Be it known that I, WILLARD A. PETTEYS, a citizen of the United States, residing at Wilcox, in the county of Kearney and State of Nebraska, have invented certain new and useful Improvements in a Truck and Dump Wagon, of which the following is a specification.

This invention relates to vehicle discharging or dumping apparatus, and has for one of its objects to provide a device of this character wherein the motive power of an auto truck is utilized to operate a truck tilting mechanism, to cause the discharge of the load.

Another object of the invention is to provide a device of this character wherein provision is made for utilizing the motive power of the vehicle to move it into tilting position, and to release the vehicle from engagement with the tilting mechanism after the load is discharged.

Another object of the invention is to provide a device of this character wherein means are provided for utilizing the motive power of the vehicle for transmitting power from certain parts of the tilting mechanism.

With these and other objects in view, the invention consists in certain novel features of construction as hereinafter shown and described, and then specifically pointed out in the claims, and in the drawings illustrative of the preferred embodiment of the invention.

Figure 1 is an elevation of the improved apparatus from one side.

Fig. 2 is an elevation from the other side.

Fig. 3 is a plan view.

Fig. 4 is a plan view with the floor and platform removed.

Fig. 5 is a longitudinal section on the line 5—5 of Fig. 3.

Fig. 6 is a sectional detail illustrating the construction of the brake device.

Fig. 7 is a plan view of the platform lowering device including the brake mechanism.

Fig. 8 is a sectional detail of the stop ratchet device.

The improved apparatus may be installed in a storage warehouse, elevator, or other structure where grain, coal, sand, gravel, or other product or material is handled in bulk, and is designed to receive motor propelled vehicles, or auto trucks, of various makes, and hold the same while being tilted to discharge or dump the load and utilize the motive power of the truck to operate the tilting mechanism.

The improved apparatus will preferably be located in an opening in the floor of the building in which the dumping action is to be performed, and it is not desired to limit the invention to any specific form of building or other structure in which the improved apparatus is installed, but for the purpose of illustration, the apparatus is shown arranged in an opening in a conventional floor or platform, represented as a whole at 10, and supported by the usual floor timbers or joist 11.

The improved apparatus includes coacting shafts 12 and 13 arranged in pairs and mounted for rotation upon the floor timbers 11 near the sides. Mounted on the shafts 12 and 13 are drums or rollers 14 and 15.

The rollers are arranged in pairs as shown in Figs. 3 and 4, and openings 17 are formed in the floor 10 above each pair of rollers, to permit the rear wheels of the truck whose load is to be dumped, to be engaged by the rollers, as hereafter explained.

The shafts 12 and 13 are provided respectively with chain wheels 18 and 19 to receive endless chains 20, while the shafts 12 are extended to receive a chain wheel 21.

Supported by hangers 22 beneath the floor timbers 11, is a main shaft 23 carrying relatively large chain wheels 24 over which and the chain wheels 21 endless chains 25 operate. By this means the motion of the shafts 12 is independently transmitted to the shaft 23 at a reduced speed.

Supported by hangers 26 below the floor timbers 11 are other shafts 27 and 28.

Swinging at 29 in the hangers 26 and in other hangers 30, are U-shaped yoke members 31, and swinging upon each yoke member is a curved plate 32 adapted to be disposed respectively over the adjacent rollers 15 when the yoke frames are actuated, and to be withdrawn beneath the floor when the yoke frames are moved in the opposite direction.

Attached to the shaft 28 are arms 33, one for each of the plates 32, and connected respectively to the plates by coupling rods 34.

By this arrangement when the shaft 28 is oscillated, the plates 32 will be actuated.

Slidable upon the floor 10 is a closure 35 for each of the openings 17, and depending from each closure are ears 36 to pivotally receive connecting rods 37. Attached to each shaft 27 are arms 38 which are coupled at their free ends to the rods 37.

Attached to the shaft 27 is a crank arm 39, and connected to the crank arm is push rod 40, the latter operating through a keeper 41 attached to the adjacent floor timber 11. The rod 40 terminates in a hand grip 42 convenient to the operator upon the floor 10.

Attached to the shaft 28 is a crank arm 43, and connected to the crank arm is a pull rod 44, the latter operating through a keeper 45 on the adjacent floor timber 11, and terminating in a hand grip 46.

By this means the closures 35 may be moved over the openings 17 or withdrawn therefrom by actuating the rod 44, and the plates 32 moved over the rollers or drums 15 by actuating the rods 40.

Supported in hangers 47 from the frame members 11 is a shaft 48, and supported in hangers 49 from the same frame members is a counter shaft 50.

Mounted on the shaft 23 is a chain wheel 51, and mounted on the counter shaft 50 is a chain wheel 52 with an endless chain 53 operating thereover.

Mounted on the counter shaft 50 and shaft 48 are chain wheels 54 and 55 over which an endless chain 56 operates. By this means the motion of the shaft 23 will be transmitted to the counter shaft 50 and thence to the shaft 48.

Arranged for vertical movement through the floor 10, are bars 57, in spaced relation, each bar having a gear rack 58.

The bars are supported in suitable guides 59 which include antifriction rollers 60, so that the bars move with the minimum of friction.

At its upper end each of the bars 57 is pivoted at 61 to standards 62, and mounted upon the standards is a platform 63, the standards being braced from the platform as shown at 64.

Connected to the platform 63 are rail members 65 which are pivoted at 66 to brackets 67 attached to the floor supports 11 adjacent to the rollers 14 and 15, as shown. Mounted on the shaft 48 are pinions 68 engaging the racks 58.

By this arrangement it will be obvious that the rotary motion of the shaft 12 will be transmitted to the shaft 48 and cause the elevation of the bars 57 and the platform 63, the latter moving in the arc of a circle of which the pivots 66 are the centers.

The platform 63 supports the forward wheels of a motor truck when the rear wheels are engaged by the drums 14 and 15.

Carried on the shaft 50 is a small chain wheel 69, and supported on the floor 10 is a standard 70 carrying a chain wheel 71 in alinement with the chain wheel 69, a chain 72 operating over the chain wheels. A ratchet 73 is carried by the chain wheel 71 and is engaged by a pawl 74 pivoted on the standard 70. The rotation of the shaft 50 is communicated to the chain wheel 71 and the ratchet 73 operates to prevent retrograde movement of the chain 72, hence the latter operates as a brake or check to prevent the platform 63 moving downwardly so long as the pawl remains in engagement with the ratchet. When the platform is to be returned to its lower position substantially level with the floor 10, the pawl 74 is released when the weight of the platform will cause it to descend.

Formed at one side of the ratchet 74 is a brake drum 75 with which a brake lever 75' is adapted to be engaged, to control the movements and prevent too rapid descent of the platform and its load.

A clutch device represented as a whole at 76 is applied to the shaft 50, and operative by a shipper lever 77, attached to a rod 78, slidable in guides 79 on the floor supports 11. The rod 78 is connected to one arm of a bell crank lever 80, the latter pivoted at 81 to the adjacent floor support 11, and operative by a lever 82 by means of a connecting rod 83. By this means the platform operating portion of the apparatus may be disconnected from the rollers, so that the latter may be actuated by the rear wheels of the vehicle to transmit motion to the shaft 12 only.

The main shaft 12 is extended at one end and provided with a belt pulley 12' or other power transmitting element, so that the motor truck motive power may be utilized for transmitting power otherwise than to the elevating mechanism of the platform 63. Slidable through the platform 63 is a rod 84 having a head 85 at its upper end, so that when the platform is elevated it carries the rod with it. Connected to a ring 86 slidable on the rod 84 is a section of cable 86', the latter leading between guide pulleys 87 connected to the adjacent floor timber 11, and attached at its other end to a rod 88 which in turn is coupled to the bell crank lever 80. The parts above noted are so proportioned that when the platform reaches a certain predetermined elevation, an enlargement 89 on the rod 84 will "pick up" the ring 86 and cause the bell crank lever to be automatically tripped to release the clutch 76 and check the further upward movement of the platform, and thus prevent injury to the parts by abnormal elevation of the same, while the downward or return movement of the platform, is prevented by the coaction of the ratchet and pawl, 73—74 and chain 71, as before described.

With an apparatus thus constructed, the operation is as follows:

Initially the mechanism will be arranged to hold the platform 63 in its lower position, the closures 35 for the openings 17 in closed position, the plates 52 withdrawn from over the drums or, rollers 14—15 and the lever 82 operated to open the clutch 76.

Thus a practically unobstructed driveway is provided for the loaded motor truck which is moved forwardly until the forward wheels have passed over the closure elements 35, but not yet upon the platform 63.

The lever arm 44 is then quickly actuated to move the closures 35 from over the openings 17, and as the forward movement of the truck continues, the forward wheels run upon the platform 63 while the still revolving rear wheels drop through the openings 17 and upon the drums 14 and 15.

The lever 82 is then reversed to cause the closing of the clutch 76. This will cause the transmission of the motion of the revolving rear wheels of the truck to the shaft 48 and elevate the bars 57 by the coaction of the gears 68 and racks 58, and the platform 63 supported thereby.

It will be noted that the engines of the truck are not stopped during the operation of running upon the platform and departing therefrom.

This movement will tilt the motor truck into load discharging position, the material composing the load running out through the "tail" of the body or box.

While the truck is being elevated into discharging position the rotation of the shaft 50 will correspondingly rotate the ratchet 73, whose pawl 74 will hold the chain 71 and consequently the platform 63 and the tilted truck from retrograde movement.

When the load has been discharged, the brake is applied, the pawl 74 released and the clutch 76 also released, when the unloaded truck will cause the platform 63 to return to horizontal position by gravity, the return movement being effectually controlled by the brake device, as will be obvious. The rod 44 is then operated to move the free edges of the plates 32 between the rollers 15 and the rear wheels of the truck which will cause the plates to serve as chocks to the revolving wheels of the truck and cause the truck to quickly climb out of the openings 17, pass over the adjacent closure members 35, and thence over the platforms 63 and out of the building.

The closures 35 are then restored to closed position ready to receive the next loaded truck.

The improved apparatus may be installed in warehouses, storage houses, elevators, or in connection with unloading platforms, or the like, and may be readily adapted without material structural change to trucks or like vehicles of various forms or sizes.

The floor portion 10 may be the ordinary floor of a building, or the floor or platform of an unloading structure, as may be found most convenient.

The preferred embodiment of the invention is disclosed in the drawings and set forth in the specifications, but it will be understood that any modifications within the scope of the claims may be made in the construction without departing from the principle of the invention or sacrificing any of its advantages.

I claim:

1. In an apparatus of the class described, a supporting body having openings to receive the rear wheels of a motor driven vehicle, a platform to receive the forward wheels of a motor driven vehicle, rotatable drums disposed in position to be engaged by the rear wheels of the motor driven vehicle when they drop through the body openings and rotatable thereby, means for elevating said platform to dispose the vehicle in discharging position, means for causing the motion of the drums to be transmitted to the platform elevating means, a yoke device swingingly supported, a chock device swinging from said yoke device and adapted to be disposed over one of said rollers, a shaft having an arm extending therefrom, a link coupling said arm to said yoke device, and means for oscillating said shaft.

2. In an apparatus of the class described, a supporting body having openings to receive the rear wheels of a motor driven vehicle, a platform to receive the forward wheels of a motor driven vehicle, cover elements for said openings and slidable upon said supporting body and adapted to provide bridge devices over said openings to carry the wheels of the vehicle thereover, a shaft mounted for oscillation and having an arm extending therefrom, a connecting member between said arm and cover member, and means for actuating said shaft.

3. In an apparatus of the class described, a supporting body, a platform for receiving the forward wheels of a motor driven vehicle, bars connected to said platform at its ends and extending in parallel relation therefrom, means for swingingly coupling said bars to the body, means for actuating said platform, and means operative by the motor of the vehicle for operating said platform actuating means to tilt the vehicle into load discharging position.

4. In an apparatus of the class described, a platform for receiving the forward wheels of a motor driven vehicle, rack bars, means for coupling said rack bars to the platform, a shaft carrying pinions engaging said racks, a counter shaft, means for causing the rotation of said counter shaft, means for transmitting the motion of said counter shaft to the pinion carrying shaft, a clutch device on said counter shaft, means for operating said clutch device, and means operative by the motor of the vehicle for actuating the shaft rotating means to cause the rack bars to move the vehicle into load discharging position.

5. In an apparatus of the class described, a platform for receiving the forward wheels of a motor driven vehicle, rack bars, means for coupling said rack bars to the platform, a shaft carrying pinions engaging said racks, a counter shaft, means for causing the rotation of said counter shaft, means for transmitting the motion of said counter shaft to the pinion carrying shaft, a clutch device on said counter shaft, means for operating said clutch device, and means whereby the clutch operating means is actuated by the platform when it is elevated to a predetermined position.

6. In an apparatus of the class described, a supporting body, a platform for receiving the forward wheels of a motor driven vehicle and movable relative to said body, means for actuating said platform, means operative by the motor of the vehicle for actuating said platform operating means to tilt the vehicle into load discharging position, a rod depending from said platform and having a stop enlargement, a ring through which said rod is movable, means for connecting said ring to the motor operated means, whereby said motor operated means is disconnected from the platform elevating means when a predetermined elevation is reached.

7. In an apparatus of the class described, a platform for receiving the forward wheels of a motor driven vehicle, rack bars, means for coupling said rack bars to the platform, a shaft carrying pinions engaging said racks, means for causing the rotation of said shaft, means operative by the motor of the vehicle for actuating the shaft rotating means to cause the rack bars to move the vehicle into load discharging position, a clutch device associated with said shaft, means for operating said clutch, a rod depending from said platform and having a stop enlargement, a ring through which said rod is movable and a coupling means between said ring and clutch actuating means.

In testimony whereof, I affix my signature hereto.

WILLARD A. PETTEYS.